(12) United States Patent
Lee et al.

(10) Patent No.: US 6,859,435 B1
(45) Date of Patent: Feb. 22, 2005

(54) PREVENTION OF DEADLOCKS AND LIVELOCKS IN LOSSLESS, BACKPRESSURED PACKET NETWORKS

(75) Inventors: David Lee, Warren, NJ (US); S. Jamaloddin Golestani, Berkeley Heights, NJ (US); Mark John Karol, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 678 days.

(21) Appl. No.: 09/624,085

(22) Filed: Jul. 24, 2000

Related U.S. Application Data (60) Provisional application No. 60/159,147, filed on Oct. 13, 1999.

(51) Int. Cl.[7] .................................................. H04J 1/16
(52) U.S. Cl. ...................... 370/231; 370/235; 370/412; 370/429
(58) Field of Search ................................ 370/412–418, 370/429, 440, 231, 235, 230, 232

(56) References Cited

U.S. PATENT DOCUMENTS

| | | | | |
|---|---|---|---|---|
| 4,933,933 A | * | 6/1990 | Dally et al. .................. 370/406 |
| 5,313,454 A | * | 5/1994 | Bustini et al. ............... 370/231 |
| 5,369,745 A | * | 11/1994 | Faber ........................... 709/240 |
| 5,471,623 A | * | 11/1995 | Napolitano, Jr. ............. 709/243 |
| 5,570,348 A | * | 10/1996 | Holden ......................... 370/236 |
| 5,689,508 A | * | 11/1997 | Lyles ........................... 370/391 |
| 5,724,351 A | * | 3/1998 | Chao et al. ............. 370/395.42 |
| 5,787,071 A | * | 7/1998 | Basso et al. ................. 370/231 |
| 5,790,522 A | * | 8/1998 | Fichou et al. ............... 370/236 |
| 5,838,922 A | * | 11/1998 | Galand et al. .............. 709/232 |
| 6,084,855 A | * | 7/2000 | Soirinsuo et al. ........... 370/235 |
| 6,122,251 A | * | 9/2000 | Shinohara .................... 370/231 |
| 6,240,075 B1 | * | 5/2001 | Takahashi et al. ........... 370/325 |
| 6,252,849 B1 | * | 6/2001 | Rom et al. ................... 370/230 |
| 6,259,698 B1 | * | 7/2001 | Shin et al. ............... 370/395.7 |
| 6,388,993 B1 | * | 5/2002 | Shin et al. ................... 370/233 |

OTHER PUBLICATIONS

Coffman, E. G. et al., "System Deadlocks", Computing Surveys, vol. 3, pp. 67–78, Jun. 1971.
Holt, R. C., "Some Deadlock Properties of Computer Systems", Computing Surveys, vol. 4, pp. 179–196, 9/72.
Merlin, P. M. et al, "Deadlock Avoidance in Store–and–Forward Networks–I: Store–and–Forward Deadlock", IEEE Trans. Commun., vol. COM–28, pp. 345–354, Mar. 1980.
Gunther, K. D. "Prevention of Deadlocks in Packet–Switched Data Transport Systems", IEEE Trans. Commun., vol. COM–29, pp. 512–524, Apr. 1981.

(List continued on next page.)

*Primary Examiner*—Brian Nguyen
*Assistant Examiner*—Ian N. Moore (57) ABSTRACT

A packet communication network is arranged so that a backpressure or feedback signal is sent from a receiving node to a node having packets to send to the receiving node, selectively allowing only certain packets to be considered eligible for transmission. The backpressure is arranged to be lossless, and to avoid network deadlocks and livelocks. The transmission of a packet p from a sending node $X_l$ to a receiving node $R_l$, via a link l, is controlled by (a) sending from the receiving node $R_l$ to the upstream node $X_l$ a feedback value $f_l$ that assures that there will be room in the buffer in the receiving node $R_l$ to store packets subsequently received from the upstream node $X_l$; (b) assigning a priority level $\lambda_p$ to packets stored in the buffer of the receiving node $R_l$; and (c) transmitting from the sending node $X_l$ to the receiving node $R_l$, only those stored packets at $X_l$ whose priority level $\lambda_p$ exceeds the feedback value $f_l$ received from the receiving node $R_l$.

13 Claims, 5 Drawing Sheets

OTHER PUBLICATIONS

Gopal, I. S., "Prevention of Store–and–Forward Deadlock in Computer Networks", IEEE Trans. Commun., vol. COM–33, pp. 1258–1264, Dec. 1985.

Holzmann, G. J., Design and Validation of Computer Protocols, Englewood Cliffs, NJ; Prentice Hall, 1991.

Noureddine, W et al, "Selective Back–Pressure in Switched Ethernet LANs", IEEE Globecom'99 Symposium on High Speed Networks, Dec. 1999, 1256–1263.

Kamolphiwong, S. et al., "Flow Control in ATM networks: a survey", Comp. Commun., vol. 21, pp. 951–968, 1998).

Caruso, J. "Gigabit Ethernet ventures into the land beyond the Lan", Network World, p. 36, May 1999.

Margalit, N. "Intelligent DWDM takes Gigabit Ethernet to the MAN", Lightwave, p. 101, Jun. 1999.

Schroeder, M. D. et al., "Aautonet: A High–Speed, Self Configuring Local Area Network Using Point–to–Point Links", IEEE J. Selected Areas Commun., vol. 9, pp. 1318–1335, Oct. 1991.

Dally, W. J. et al., "Deadlock–Free Message Routing in Multiprocessor Interconnection Networks", vol. C–36, pp. 547–553, May 1987.

Leonardi, E. et al., "Congestion Control in Asynchronous, High Speed Wormhole Routing Networks", IEEE Commun. Mag., pp. 58–69, Nov. 1996.

Iliadis, I., "A New Feedback Congestion Control Policy for Long Propagation Delays", IEEE J. Select. Areas Commun., vol. 13, pp. 1284–1295, Sep. 1995.

Golestani, S. J. et al., "A Class of End–to–End Congestion Control Algorithms for the Internet", Proc. $6^{th}$ Intnl. Conf. On Network Protocols, Oct. 1998.

Karol, M. et al., A Simple Technique that Prevents Packet Loss and Deadlocks in Gigabit Ethernet, Proc. 1999 Intnl Symposium on Communications (ISCOM'99), pp. 26–30, Nov. 1999.

\* cited by examiner

| A's LEVEL TABLE | | B's LEVEL TABLE | | C's LEVEL TABLE | |
|---|---|---|---|---|---|
| DEST. | LEVEL | DEST. | LEVEL | DEST. | LEVEL |
| X | 1 | X | 4 | X | 1 ← 2 |
| Y | 1 | Y | 1 | Y | 1 |
| Z | 2 | | | Z | 3 |
| | | | | | |

THE LEVEL OF THIS PACKET IS LIFTED TO 4 WHEN IT IS BUFFERED AT B

WHEN THIS PACKET IS BUFFERED AT C, THE ENTRY FOR X IN THE LEVEL TABLE IS INCREASED TO 2

FIG. 9
SEND FUNCTIONS AT A NODE $X_\ell$

FIG. 10
RECEIVE FUNCTIONS AT A NODE $R_\ell$

PREVENTION OF DEADLOCKS AND LIVELOCKS IN LOSSLESS, BACKPRESSURED PACKET NETWORKS

CROSS REFERENCE TO RELATED APPLICATION

This application claims priority of Provisional Application Ser. No. 60/159,147 which was filed on Oct. 13, 1999.

FIELD OF THE INVENTION

The present invention relates generally to packet telecommunications networks, and in particular, to control of interconnected nodes in such packet networks in which deadlocks, livelocks and buffer overflow (packet loss) are avoided by providing a selective backpressure or feedback signal from a receiving node to a sending node having packets to send to the receiving node.

BACKGROUND OF THE INVENTION

Congestion occurs in packet networks when the demand exceeds the availability of network resources, leading to lower throughputs and higher delays. If congestion is not properly controlled, some packets will not get to their destinations, or will be unduly delayed. As a result, various applications requiring the information contained in the packets transported by the network may not meet their quality-of-service (QoS) requirements.

Proper congestion control is especially an important topic in emerging local area networks (LANs): large LANs with a heterogeneous mix of link speeds (ranging, for example, from 10 Mbps up to 1 Gbps) and the need to support the quality-of-service (QoS) requirements of multimedia applications from hundreds or even thousands of users.

When congestion builds up in a packet network, two general approaches are possible to cope with the shortage of buffer space. One approach is to drop incoming packets for which buffer is not available and to rely on the end-to-end protocols for the recovery of lost packets. Dropped packets are later retransmitted by end-to-end protocols. In many situations, dropping packets is wasteful, since the dropped packet has already traversed a portion of the network. Retransmissions of dropped packets also may lead to unnecessarily large end-to-end delays.

An alternative approach is to insist that no packets should be dropped inside a packet network, even when congestion builds up. One way to accomplish this goal is to have the congested nodes send backpressure feedback to neighboring nodes, informing them of unavailability of buffering capacity and in effect stopping them from forwarding packets until enough buffer becomes available. While backpressure can be a useful approach, this method of dealing with congestion can potentially lead to deadlocks and livelocks in the network.

Figure 1:
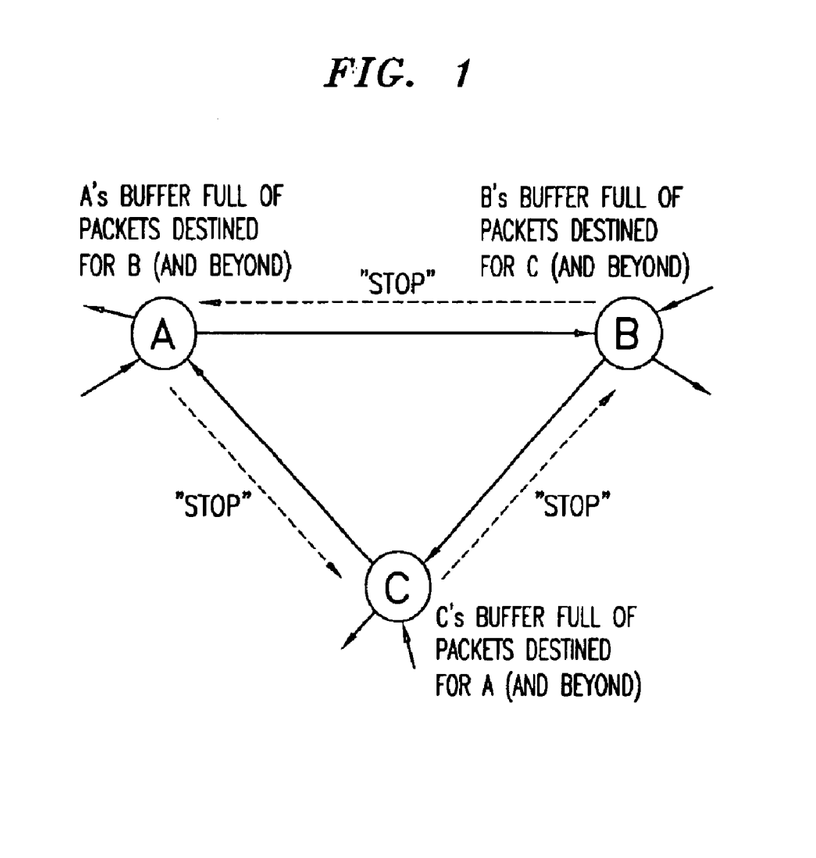
FIG. 1 is a diagram illustrating three interconnected nodes that are involved in a deadlock condition.

A deadlock is a condition under which the throughput of the network, or part of the network, goes to zero due to congestion (i.e., no packets are transmitted). This can be explained by reference to FIG. 1, which shows three interconnected nodes A, B and C. (Note that A, B and C can be any three adjacent nodes that form a "cycle" in a larger network of nodes.) Assume node A's buffer is full with packets destined for node B and beyond. Accordingly, node A sends a "stop" signal to its upstream nodes, in this example, node C. Likewise, if node B's buffer is full with packets destined for node C and beyond, and node C's buffer is full with packets destined for node A and beyond, both node B and C also send "stop" signals to their respective upstream nodes, in this example, node A and B. Under these circumstances, there is entire stoppage because each node in the loop has been directed to "stop" transmission. Stated another way, each network process, having resources required by the others, refuses or neglects to release them, causing the other processes to wait indefinitely.

Figure 2:
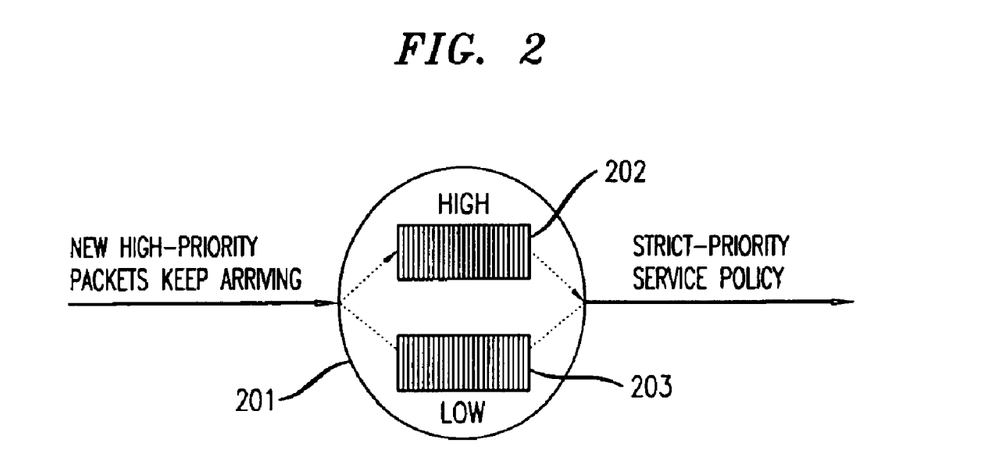
FIG. 2 is a diagram illustrating a node having high and low priority buffers, in which a livelock condition may occur.

In a livelock situation, the network is not stopped, but one or more individual packets are never transmitted. FIG. 2 shows a simple example of a livelock that can occur when a node 201 with separate high and low priority buffers 202 and 203, respectively, uses a strict-priority output link scheduling algorithm: low-priority packets in buffer 203 are forced to indefinitely wait in buffer 203 as new higher-priority packets continue to arrive at buffer 202 in node 201. These higher-priority packets get serviced, to the exclusion of packets in buffer 203. Even if all the link scheduling algorithms in a network are well-behaved (i.e., they don't indefinitely neglect the transmissions of any particular packets), livelocks ban still occur as a result of "network-level" effects. For instance, a hop-count-based flow control protocol might cause some node to (indefinitely) block its transmission of packets that have traveled fewer than a specified number of hops. From the foregoing, it is seen that livelocks are an extreme example of "unfairness," in which packets are "stuck" as they wait indefinitely in a queue while other packets (including new arrivals) are continually served.

Many different types of deadlocks have been identified and studied, along with methods of preventing them. (See, e.g., "System Deadlocks" by E. G. Coffman et al, *Computing Surveys*, Vol. 3, pp. 67–78, June 1971; "Some Deadlock Properties of Computer Systems" by R. C. Holt, *Computing Surveys*, Vol. 4, pp. 179–196, September 1972; "Deadlock Avoidance in Store-and-Forward Networks-I: Store-and-Forward Deadlock" by P. M. Merlin et al, *IEEE Trans. Commun.*, Vol. COM-28, pp. 345–354, March 1980; "Prevention of Deadlocks in Packet-Switched Data Transport Systems", by K. K. Gunther, *IEEE Trans. Commun.*, Vol. COM-29, pp. 512–524, April 1981; "Prevention of Store-and-Forward Deadlock in Computer Networks", by I. S. Gopal, *IEEE Trans. Commun.*, Vol. COM-33, pp. 1258–1264, December 1985; *Design and Validation of Computer Protocols* by G. J. Holzmann, Englewood Cliffs, N.J.: Prentice Hall, 1991.)

In the LAN context, recent simulation results show that hop-by-hop backpressure can be better than TCP for dealing with short-lived congestion. (See "Selective Back-Pressure in Switched Ethernet LANs", by W. Noureddine et al., *IEEE GLOBECOM'99 Symposium on High Speed Networks*, December 1999.) TCP, the dominant transport protocol in the Internet, uses packet drops as an indication of congestion and requires sufficient levels of loss in order to be an effective control. In a sense, TCP keeps increasing the load in order to increase the loss so that the necessary feedback signals are sent. Hop-by-hop backpressure helps reduce the number of packets dropped during periods of transient congestion, and avoids wasting the network resources so far already consumed up to this point. This is particularly important when we consider packets that might arrive at a LAN after traversing a wide area network (WAN). The penalty is that some links are "turned off" for short periods of time, perhaps negatively impacting other flows (i.e., those not involved in the "congestion") as the backpressure propagates through the network. The advantage is that the distributed memory resources in a network can be used to buffer excess traffic generated by bursty sources. This helps bypass the costly TCP flow control mechanism, which may have a negative performance impact in the LAN context. (See "Flow Control in ATM networks: a survey" by S. Kamolphiwong et al., *Comp. Commun.*, Vol. 21, pp. 951–968, 1998.)

Although a backpressure congestion control mechanism, in which a node receiving a packet controls the stop-start behavior of a node intending to transmit a packet to the receiving node, can, in theory, eliminate packet loss in networks, this capability is obviously gone if packets need to be dropped to prevent deadlocks or to recover from a deadlock condition. Proper strategies for dealing with deadlocks increase in importance as data transmission rates increase to gigabit-per-second (and higher) rates. For a given network load level, the number of potential deadlocks per hour that have to be prevented, avoided, or recovered from, increases in proportion to the transmission rate. In addition, potential deadlocks will occur more-frequently as the network loading increases. So, for instance, as gigabit Ethernet links are extended to cover greater distances in metropolitan-area networks (MANs) and WANs, heavier loading of long-distance links to make efficient use of the links will cause potential deadlocks to occur more frequently. Currently, proprietary hardware and high-quality fiber-optic lines can extend the distances between switches to greater than 70 km, permitting gigabit Ethernet implementations across MANs and even WANs. (See "Gigabit Ethernet ventures into the land beyond the Lan" by J. Caruso, *Network World*, p. 36, May 1999; and "Intelligent DWDM takes Gigabit Ethernet to the MAN" by N. Margalit, *Lightwave*, p. 101, June 1999.)

One simple way to deal with deadlocks is to just start dropping packets once a deadlock has occurred, or is "about to occur" (i.e., as congestion increases). For certain types of packets (for example, "real-time" traffic and traffic that can permit packet loss), this approach works fine. However, packets that must eventually reach their destinations will need to be retransmitted if they are dropped to avoid a deadlock or recover from a deadlock condition. The impact on total end-to-end delay, including interactions with higher-layer protocols (such as TCP), needs to be considered. Also, retransmission of packets might even cause the "deadlock condition" to redevelop.

Another way to deal with deadlocks is to simply increase the size of available bandwidth and/or buffers. The obvious theory here is that if peak amounts of bandwidth and buffers are available and are dedicated for all network traffic flows, then buffers do not overflow and deadlocks are not created. This approach, however, is typically too wasteful of network resources and requires stringent admission control procedures.

Yet another way to deal with deadlocks is to use up/down routing on a spanning tree (see "Autonet: A High-Speed, Self Configuring Local Area Network Using Point-to-Point Links" by M. D. Schroeder et al., *IEEE Jour. Selected Areas Commun.*, Vol. 9, pp. 1318–1335, October 1991), thereby assigning directions to the links, and avoiding cycles. However, the selected paths (to create the spanning tree) are generally not the shortest and links near the root of the spanning tree become bottlenecks, limiting the network throughput.

Another way to avoid cycles in the network (which can lead to deadlocks) is to split each physical link into a number of virtual channels, each with its own queue and stop-start backpressure protocol. (See "Deadlock-Free Message Routing in Multiprocessor Interconnection Networks" by W. J. Dally et al., *IEEE Trans. Comput.*, Vol. C-36, pp. 547–553, May 1987; and "Congestion Control in Asynchronous, High Speed Wormhole Routing Networks" by E. Leonardi et al., *IEEE Commun. Mag.*, pp. 58–69, November 1996.) Bandwidth is shared among the virtual channels. Layers of acyclic virtual networks and deadlock-free routes are created using the virtual channels. However, as the number of virtual channels increases, the scheduling becomes more complicated. Also, a method of associating individual packets with particular virtual channels is required.

Finally, more sophisticated buffer allocation strategies (structured buffer pools) can be used to prevent deadlocks. Extra buffers are allocated for packets that have higher "priority" because they have traveled greater distances (e.g., number of hops) in the network (or are closer to their destinations). In other words, using "distance" information in the packet headers, buffer space is reserved at each network node according to the distance traveled through the network from a source (i.e., the number of hops). This technique is again complicated and expensive to implement.

There are several problems with these prior deadlock prevention techniques. First, and most important for the gigabit Ethernet scenario, they may not be compatible with the IEEE 802.3z standard. Most prior approaches require packet headers to include the "distance information" (such as, for example, the packet's hop count). There is no such provision for including distance information in the header of IEEE 802.3z packets. Alternatively, some other ("non-standard") way would need to be employed for transferring the "distance" information downstream to the next node.

A second problem with prior approaches is that although deadlocks are prevented, the end-to-end packet sequence may not be preserved. This may cause problems for some sessions that expect to receive packets in sequence, and perhaps can deal with "missing" (i.e., dropped) packets better than "out-of-sequence" packets. For instance, it is possible that a session's packets might be transmitted out-of-sequence to the next node because they were stored in different buffer classes (even though they all arrive with the same hop-count). Specific information would need to be kept regarding the order in which packets were stored in the various buffer classes.

A third problem with prior approaches is that although they resolve the deadlock problem, some do not eliminate the possibility of livelock. For example, if the scheduling algorithm and signaling protocol are not carefully designed, then in the continual presence of new arrivals with higher hop counts, packets in lower buffer classes might never have a chance to be transmitted.

A fourth problem with prior approaches is that network nodes need some type of "signaling message" to tell upstream neighbors which packets they can transmit (alternatively, they need a way to send negative acknowledgements when packets are dropped). Provision for such a signaling message does not exist in the IEEE 802.3z standard.

Finally, a fifth problem with some prior approaches is that a method of determining the current "distance to destination" information must be available in the network. This gets particularly challenging when the possibility of network reconfigurations and routing table updates must be taken into account, which can change the source-to-destination distances.

SUMMARY OF THE INVENTION

The present invention is used in a packet communication network comprised of interconnected nodes arranged to transmit packets of variable length γ to adjacent nodes, where D is the maximum number of nodes that a packet must traverse through said network (i.e., the :maximum number of hops) from an originating source to an ultimate destination. Each node in the network is, at the same time, both a transmitting node and a receiving node for its respective output and input links. For purposes of explanation of the present invention, the characteristics and arrangement of each node is best described by referring to an exemplary pair of nodes as a sending node $X_l$ connected to a receiving node $R_l$ via a link l. Each node $X_l$ and $R_l$ includes a buffer for storing packets enroute from the originating source node to the ultimate destination node, and management hardware/software capability to (a) assign a local priority level $\lambda_p$ (from amongst at least two possible priority levels) at the node to packets stored in the buffer, (b) formulate a feedback value $f_l$ sent from the receiving node $R_l$ to the sending node $X_l$, that assures that there will be room in the buffer in the receiving node $R_l$ to store packets subsequently received from the upstream node $X_l$, and (c) transmit from the sending node $X_l$ to the receiving node $R_l$, only those packets in the buffer in the sending node $X_l$ that are eligible for transmission as a result of the fact that the packets have a priority level $\lambda_p$ at $X_l$ that exceeds the feedback value $f_l$ received from the receiving node $R_l$.

The priority level $\lambda_p$ assigned to packets stored in the buffer at $R_l$ is based upon the ultimate destination to which the packets are to be transmitted, such that all packets intended for the same ultimate destination have the same priority level. Therefore, we represent the priority level associated with a particular destination d as the destination level $\lambda^d$. Initially, the priority level $\lambda^d$ is set to 0 for all destinations. When a packet p with ultimate destination d arrives at $R_l$ from another network node ($X_l$) over some link l, the priority level $\lambda^d$ at $R_l$ associated with d is updated as the maximum of (a) the prior value of $\lambda^d$ at $R_l$, or (b) $1+f_l$ where $f_l$ is the value of the most recent transmit feedback sent over the reverse link l' from node $R_l$ to node $X_l$. Note that when a packet p with destination d enters the network at node n (over some network access link) the destination level $\lambda^d$ at node n does not change. Note also that when the priority level $\lambda^d$ at $R_l$ is increased to $1+f_l$, the priority levels $\lambda_p$ of all packets with ultimate destination d is automatically increased to $1+f_l$, which is the new value of $\lambda^d$ at $R_l$.

In one embodiment of the present invention, the priority level assigning step is :accomplished by assigning a priority level $\lambda_p$ at $R_l$ that is less than or equal to D minus the number of hops remaining between the receiving node $R_l$ and the ultimate destination.

The feedback value $f_l$ sent from a receiving node $R_l$ to a sending node $X_l$ is determined by first setting in the buffer at the receiving node $R_l$ thresholds $B_i$ that limit the maximum amount of space for packets with priority levels $\lambda^d$ less than or equal to i. At all times, all $B_i$ buffer threshold constraints must be satisfied. This division is not a physical partitioning of the buffer space, but is only an allocation of space. Allocation typically occurs when the system is initialized.

The receiving node $R_l$ thereafter monitors the priority levels $\lambda^d$ of arriving and departing packets, and the increasing of priority levels $\lambda_p$ of previously-stored packets, and thus keeps track of the total space in the buffer at $R_l$ occupied by packets of various priority levels $\lambda^d$. The feedback $f_l$ sent from the receiving node $R_l$ to the sending node $X_l$ represents the lowest priority level of packets that the receiving node $R_l$ could accept without violating any of the $B_i$ buffer threshold constraints. In other words, the receiving node $R_l$ has room to accept packets of priority level $(1+f_l)$ or greater, without violating any of the buffer threshold constraints, but the receiving node $R_l$ cannot accept packets of priority level $f_l$ or lower because it could possibly cause one or more of the buffer threshold constraints to be violated.

The present invention is a lossless method of preventing deadlocks and livelocks in backpressured packet networks. In contrast with prior approaches, the present invention does not introduce any packet losses, does not corrupt packet sequence, and does not require any changes to packet headers, such as attaching a hop counter, as required by the prior approaches. Because the proposed technique makes use of only the Destination Address in each packet header, and because the format of a typical gigabit-Ethernet packet, for example, contains the Destination Address but not a hop-counter field, the present invention can advantageously be used not only in a general packet network, but also in gigabit Ethernet (IEEE 802.3z) networks. In such networks, a PAUSE frame stops the flow of data frames for specified periods of time (indicated by a parameter in the PAUSE frame). A PAUSE frame that contains a parameter of zero time allows the flow of data frames to restart immediately.

BRIEF DESCRIPTION OF THE DRAWING

The present invention will be more fully appreciated from a consideration of the following Detailed Description, which should be read in light of the accompanying drawing in which.

DETAILED DESCRIPTION

Figure 3:
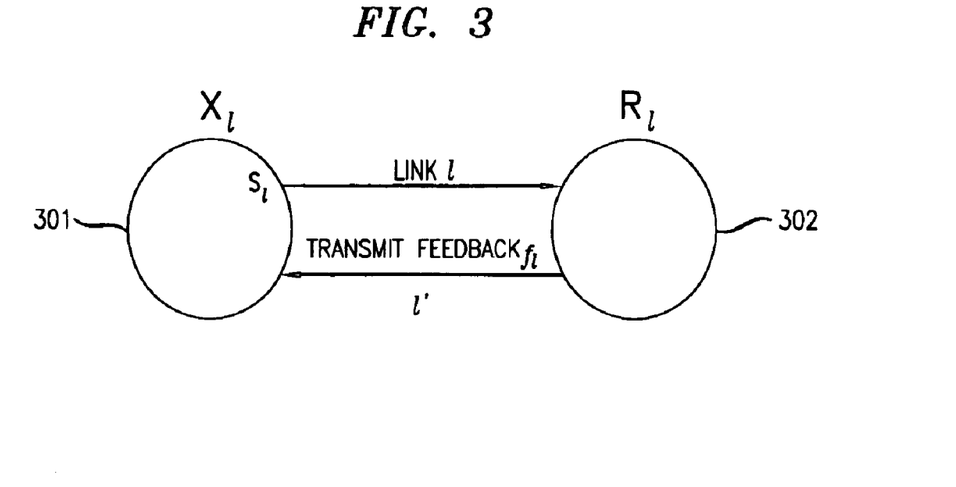
FIG. 3 is a diagram illustrating two interconnected nodes, and the forward data link and feedback control link connecting them.

Referring first to FIG. 3, consider a packet network that includes two nodes 301 and 302 connected by a one-way communication link l. The sending node 301 is designated by $X_l$, the receiving node 302 is designated by $R_l$, and the communication link going in the reverse direction, from $R_l$ to $X_l$, by l'. Let $S_l$ denote the scheduling algorithm of link l, i.e. the algorithm employed at node $X_l$ to select the next packet from those buffered at $X_l$ for transmission over l. As in prior art arrangements, the scheduling algorithm $S_l$ could possibly base its selection on a number of factors, including packets' order of arrival, service priorities, service deadlines, and fairness considerations. The present invention enhances any prior art scheduling algorithm $S_l$ and avoids packet losses in the network by employing a selective backpressure congestion control mechanism for each link l, to control the eligibility of packets to be transmitted over link l. In this arrangement, before the buffer at the receiving node $R_l$ of a link l overflows, a stop feedback is sent to the sending node $X_l$, over the reverse link l'. Unlike prior art backpressure mechanisms, the present invention is arranged to avoid the occurrence of deadlocks and livelocks in the network.

Under normal, uncongested conditions, all packets waiting at a sending node to be sent over link l to $R_l$, are eligible for transmission and may be selected by the link scheduling algorithm $S_l$. However, as the buffer at the receiving node $R_l$ gets congested, e.g., fills up close to its capacity, the set of packets that are eligible for transmission (i.e., those packets that may be selected by the scheduling algorithm $S_l$ to be sent over link l) is gradually restricted. This is accomplished by sending a Transmit Feedback parameter $f_l$, to be discussed shortly, over the communication link l' in the reverse direction, from $R_l$ to $X_l$. As the congestion at node $R_l$ subsides, the restriction placed on the transmission of packets over l is gradually increased by designating more packets as eligible using a new value of Transmit Feedback $f_l$.

Let D denote the maximum number of hops in any legitimate network route (or an upper bound on the number of hops if the maximum is, a priori, unknown). D depends on the network topology and routing protocol. For instance, if shortest path routing is used, then D is the diameter of the network. We associate with each packet p buffered at a node an integer value between 0 and D, inclusive; we call that assigned value the level of p and denote it as $\lambda_p$. When a packet is forwarded in the network from one node to another, no information about the level that was assigned to the packet in the first (sending) node is carried along with it. For instance, packet levels are not included in the packet headers (in contrast with, for example, prior deadlock-prevention schemes that carry hop counts in packet headers). To carry such information would require a change in existing Ethernet standards. Nonetheless, as will be discussed below, the present invention allows the receiving node to infer some partial information about the level that the packet held in the previous node. Typically, the level assigned to the packet in the new (receiving) node is different than its previous level.

Like packet levels, the Transmit Feedback $f_l$ also assumes an integer value between 0 and D, inclusive. The eligibility of packets for transmission over each link l is determined by the value of the corresponding Transmit Feedback $f_l$ in accordance with the following rule:

Transmit Eligibility Rule:

A packet p waiting at node $X_l$ is eligible to be picked up by the scheduler of link l for transmission over l, if its current level $\lambda_p$ satisfies $$\lambda_p \geq f_l, \qquad (1)$$

where $f_l$ is the most recent Transmit Feedback received by $X_l$ from the receiving node $R_l$. It follows from this rule that when $f_l=0$, all packets are eligible for transmission over l. As $f_l$ increases, the protocol becomes gradually more restrictive and fewer and fewer packets are considered eligible for transmission over l.

In a real network, it takes some time until a Transmit Feedback $f_l$ sent by $R_l$ reaches $X_l$. Likewise, the effect of eligibility designations made at $X_l$, as the result of the Transmit Feedback received from $R_l$, does not reach $R_l$ until after a delay related to the propagation time of l. In order to focus on the essence of the present invention, and not be sidetracked by secondary issues, we assume that the propagation delays of all network links are zero and that the Transmit Feedback generated at a receiving node $R_l$ is instantaneously sent to and detected by the sending node $X_l$. Later, we will discuss necessary modifications in the protocol to accommodate real network scenarios where these conditions are not met.

Next, we describe how the level of a packet arriving at a node is determined. Let packet p arrive at node $R_l$ over link l, and assume that $f_l$ is the most recent Transmit Feedback sent to $X_l$. It follows that the level of p prior to transmission from the previous node ($X_l$) must have been $f_l$ or larger. To guarantee freedom of deadlock in the network, it suffices to assign level $1+f_l$ to packet p (as well as follow the buffer management and feedback rules described below). However, this simple approach can lead to the assignment of different levels, at a given node, to packets of the same session, which in turn can result in misordering of these packets when they are forwarded to the next downstream node.

To avoid Disordering of packets belonging to the same session, it is advantageous (but not essential) to adopt the following principle in the implementation of the present invention at each node and at each point of time, all buffered packets that have a common destination should have the same level (so that all will be eligible/ineligible at the same times, and therefore selected for transmission in the correct order). This principle may be accomplished at each node by increasing the level of all packets with a common destination to the highest level among them (which also potentially increases their opportunities to be eligible for transmission). With this modification, it is more appropriate to view the level assignments at a node as being performed on a per-destination, rather than per-packet, basis. In accordance with this viewpoint, at a given node, let us denote the level associated with a destination d, by $\lambda^d$. The selective backpressure protocol of the present invention is based on the following rules for the assignment and updating of these destination levels.

Level Assignment Rules:

1. Every node n maintains a list of all destinations d that it encounters, along with the associated level $\lambda^d$. We refer to this list as the Level Table of node n. Initially, there are no entries in the Level Table.
2. By default, the level of any destination not included in the Level Table is zero. Accordingly, any destination which has a level equal to zero may be eliminated from the Level Table.
3. At any point of time, the level $\lambda_p$ of each packet p which is buffered at node n is equal to the level $\lambda^d$ associated with the corresponding destination d, at that time.
4. When a packet p with destination d arrives from another network node over some link l, the level associated with d is updated as $$\lambda^d \leftarrow \max(\lambda^d, [1+f_l]), \qquad (2)$$

where $f_l$ is the value of the most recent Transmit Feedback sent over the reverse link l'.

5. When a packet p with destination d enters the network at node n (over some network access link) the level $\lambda^d$ does not change. For instance, when a packet p arrives with destination d and that destination d is not included in the Level Table for node n, then the level $\lambda^d$ remains set to zero.

6. When all buffered packets with destination d have left node n, it is permissible (but not necessary) to eliminate destination d from the Level Table at n. In other words, it is only necessary to keep values in the Level Table for destinations of currently-buffered packets. Note from rule 2 above that such elimination is equivalent to resetting $\lambda^d$ to zero. It also serves to automatically "refresh" entries in the Level Table, which is needed since the topology or routing paths may change over time.

Before proceeding, we present a few important observations regarding the above rules:

If all packets encountered by node n and destined for destination d enter the network at n, then $\lambda^d$ is always equal to zero since it is never subjected to the update in rule 4 above. This means that packets arriving into the network at node n and destined for d will assume level zero at n, provided that n does not encounter any traffic destined for d that comes from another network node.

When a packet arrives at node n from another network node, it will be assigned with a level of at least 1, since the level associated with its destination will undergo the update in rule 4 above.

Updating according to the above rules will never result in a level larger than D. By the time the level associated with a packet reaches D, the packet must have reached its destination. Typically, packets' levels are less than D when they reach their destinations.

Nodes do not need to keep track of the levels associated with each and every individual buffered packet. Each node only needs maintain a short Level Table listing the destinations for which packets are buffered at the node.

Figure 4:
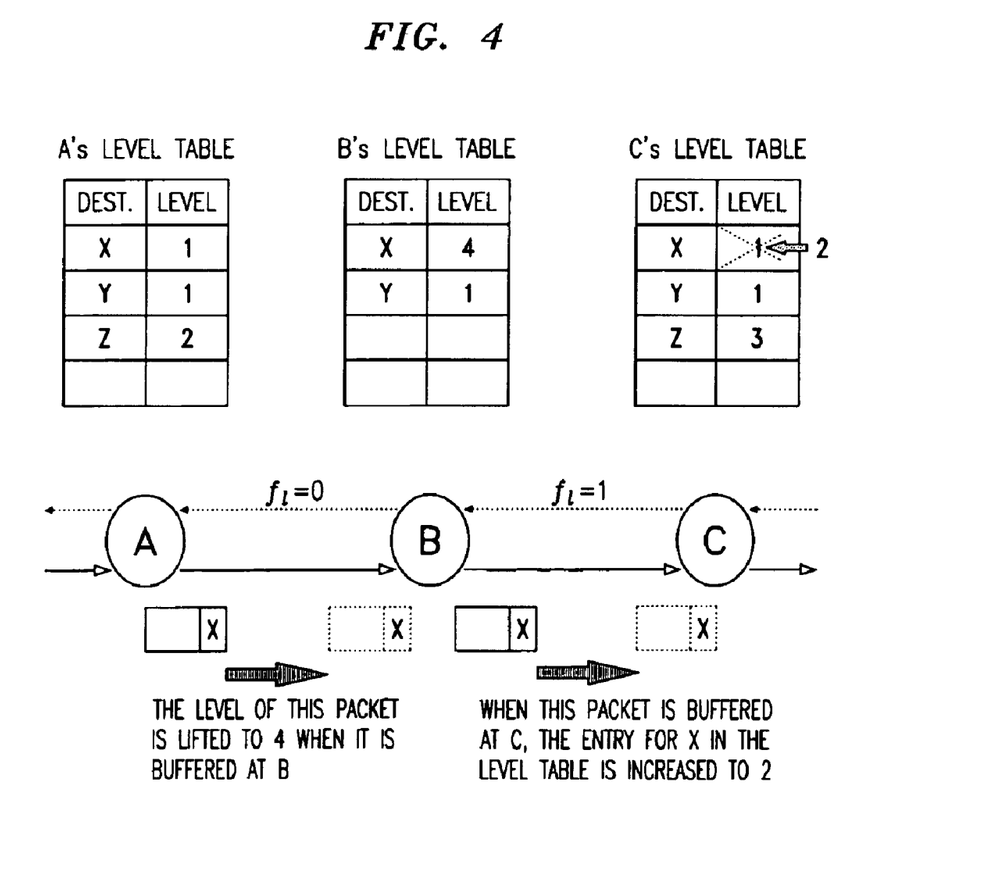
FIG. 4 shows a network of three serially interconnected nodes, and, in accordance with the present invention, the "Level Table" associated with those nodes, showing the "level" assigned to packets buffered in those nodes based upon the destinations of the packets.

To illustrate how levels are assigned, FIG. 4 shows a network example of various levels and Transmit Feedback values. Three serially interconnected nodes A, B and C are shown, with the heavy line from left to right indicating the packet data path, and the lighter line from right to left indicating the feedback path. Nodes X, Y and Z are assumed to be destination nodes that are interconnected with the nodes A, B and C by yet other parts of the network that are not shown. In other words, we are assuming for illustration purposes that a routing process will have certain packets destined for nodes X, Y and Z pass through nodes A, B and C in order to get to their final destinations.

As shown in FIG. 4, node A has permission to transmit a packet destined to node X to node B, because the level associated with X in node A's level table (i.e., "1") is not less than the Transmit Feedback parameter (i.e., "0") returned to node A via the reverse link to node B. When the same packet reaches and is buffered at node B, the level of the packet is increased to "4", which is the value associated with destination X in node B's Level Table. This is because of Rule 4 above. Similarly, node B has permission to transmit the packet destined to node X to node C, because the level associated with X (i.e., "4") is not less than the Transmit Feedback parameter (i.e., "1") received in node B via the reverse link from node C. When the packet reaches and is buffered at node C, the entry for destination X in node C's level Table was "1". This value, however, is increased to "2" (which automatically increases the level to "2" of any other packets in the node C buffer destined for node X), again as a result of the application of Rule 4 above. Notice in this simple example that the level of the packet destined for node X went from "1" to "4" to "2" as it passed from nodes A to B to C.

Figure 5A:
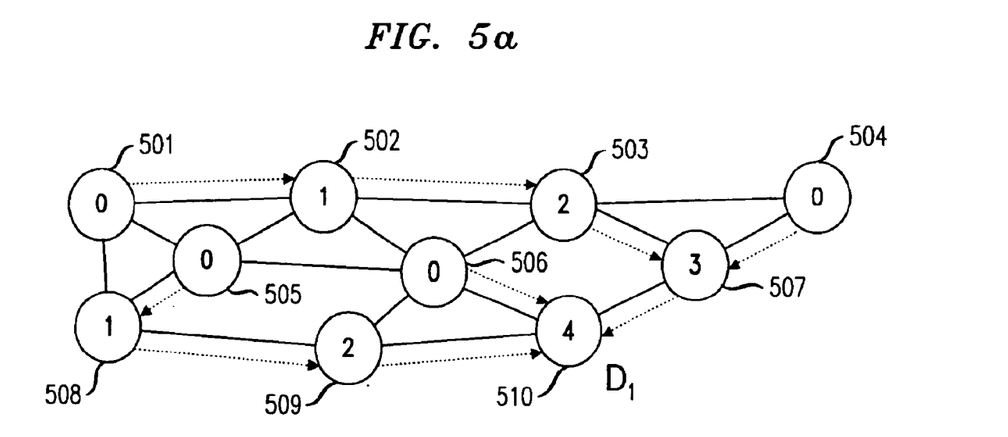
FIGS. 5a and 5b show two instances of the same sample 10-node network, with specific routing paths to reach destinations $D_1$ and $D_2$, respectively.
Figure 5B:
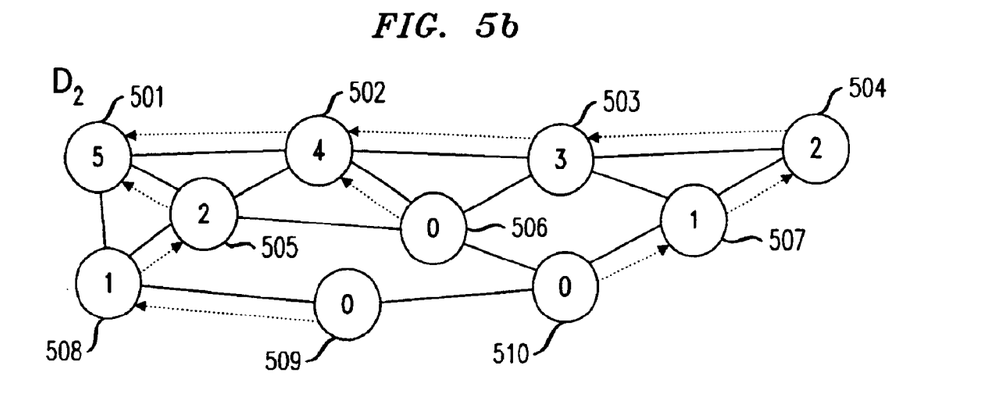

The example of FIG. 4 shows that a packet's level is quite "volatile" as it travels through a network; the level can even increase while it is buffered at a node (as at node C in FIG. 4). One of the few things that can be said about a packet's level is that it is less than or equal to D minus the number of hops remaining to the packet's destination. As an illustration, FIGS. 5a and 5b show two instances of the same sample 10-node network, with specific (exemplary) routing paths to reach destinations $D_1$ and $D_2$, respectively. Inside each node is an integer that indicates the maximum possible level of packets destined to $D_1$ or $D_2$. Consider FIG. 5a first. Note that every node 501–510 has some path to reach destination D1, which is node 510 At a leaf of the routing tree (e.g., nodes 501 and 504), the level is always zero. A packet entering the network at node 507, however, might be assigned a level as large as "3" because of the impact on node 507's Level Table from packets that entered the network at a previous node, such as node 501 and that may have attained a level equal to 3 at node 507. Likewise, the packets that enter at node 504 (with their levels initially set to "0") might have their levels increased to "3" when they reach node 507. Similar observations can be made with the set of paths in FIG. 5b that route packets to node 501 (which is labeled as $D_2$ in FIG. 5b). In this example, nodes 506, 509 and 510 are leaf nodes, and a packet going from node 506 to node 502 would have its level increased from "0" to "4" as it travels toward node 501.

In summary, a packet's level increases and decreases as a function of the topology, the distance the packet travels, the "recent history" of arrivals (throughout the network), and the state of network congestion.

Now that we have described the concepts of packet (or destination) levels, the Transmit Feedback, and the Transmit Eligibility Rule, we explain in the next few paragraphs how the values for the Transmit Feedback are selected. First, though, we need to briefly describe the general switch architecture under consideration.

Figure 6:
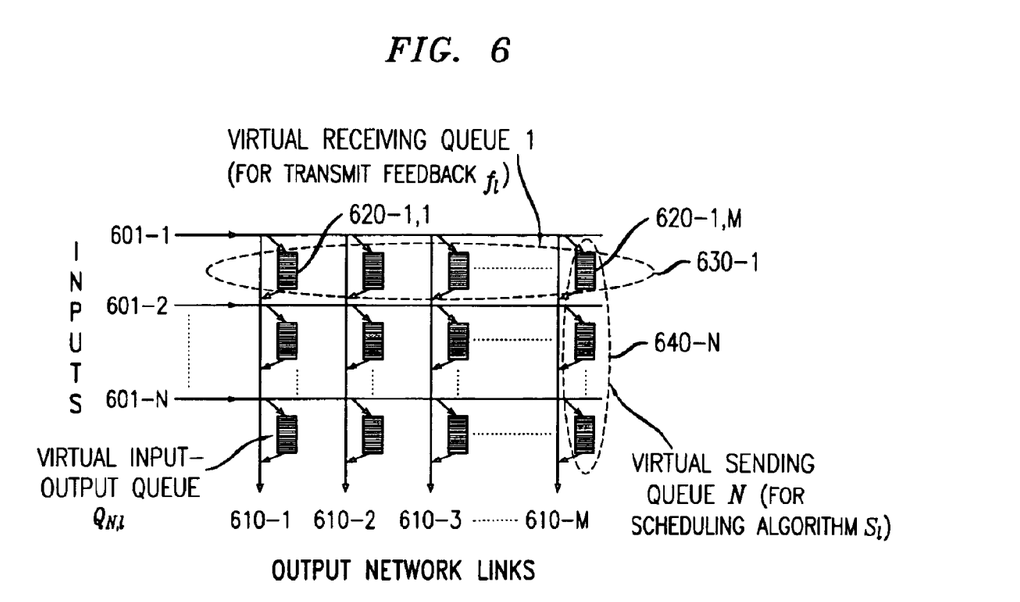
FIG. 6 is a diagram illustrating the crosspoint switch portion of a node arranged in accordance with the present invention, showing the various virtual queues within the switch.

The selective backpressure technique of the present invention can be used in networks with arbitrary switch configurations. So, we consider a general switch model for each node of the network, as illustrated in FIG. 6. The switch includes a cross point matrix selectively interconnecting N input links 601-1 through 601-N with M output links 610-1 through 610-M. A virtual input-output queue 620-1,1 through 620-N,M is associated with each input-output pair (i,j), a virtual Receiving Queue 630-1 through 630-N is associated with each incoming network link, and a virtual Sending Queue 640-1 through 640-M is associated with each outgoing network link. The Receiving Queue 630 associated with an incoming link l is used for determining the Transmit Feedback $f_l$, and the Sending Queue 640 is used with its associated scheduling algorithm in determining the next packet to be transmitted—selecting from those packets that are eligible, including those generated at the node and stored in the buffers assigned for traffic entering the network at the node. Note here that FIG. 6 does not explicitly show the buffers assigned for the traffic entering (and also leaving) the network at the node (i.e., over some network access link). Note also that in the switch model illustrated in FIG. 6, each packet is at the same time treated as belonging to both a Receiving and a Sending Queue. We assume that the scheduling algorithm $S_l$ is well-behaved, meaning that eligible packets in each Receiving Queue (i.e., arriving from each of the input links) will eventually be selected for transmission over an output link. Otherwise a livelock would result if the link scheduling algorithm $S_l$ continually refused to select a particular eligible packet for transmission over an output link.

This general switch model of FIG. 6 can be physically implemented in many ways, which is why it is important to state that the defined input-output queues 620, the Receiving Queues 630, and Sending Queues 640 are virtual. For instance, in a completely-shared-memory switch, all Input-Qutput, Receiving, and Sending Queues are maintained in lists as packets arrive on various incoming links and depart on various outgoing links. In an input-buffered (output-buffered) switch, however, the Receiving (Sending) Queue could be a physical buffer and the other Queues would still be virtual entities that are maintained by, for example, keeping lists of packets destined for (coming from) various outgoing (incoming) links.

Now consider again an arbitrary network link l and the receiving node $R_l$. We refer to the input buffer at $R_l$ that is associated with the incoming link l as the Receiving Queue of l. Let the size of this buffer be denoted by $b^l$, and let $\gamma_{max}$ denote the maximum size of a packet in the network. Our core idea for deadlock prevention is to manage the Receiving Queue of each link l and to set the value of the Transmit Feedback $f_l$ as described in the following paragraphs.

Figure 7:
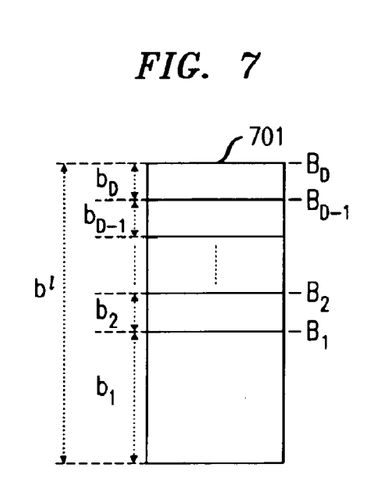
FIG. 7 is a diagram illustrating the segmentation of the receive buffers within the switch of FIG. 6.

As illustrated in FIG. 7, we divide a buffer 701 having a total buffer size $b^l$ into D parts $b_i$, i=1, 2, . . . , D satisfying $$b_i \geq \gamma_{max}, \quad (3)$$

$$b^l = \sum_{j=1}^{D} b_j \geq D \cdot \gamma_{max}. \quad (4)$$

This division is not a physical partitioning of the buffer space; it is only an allocation of space. Note here that in reality, the size $b^l$ of buffer 701 is only weakly dependent on the maximum route length D. Most of the buffer space is in $b_1$ (i.e., typically $b_j < b_1$ for j>1) and the partitioning is "virtual."

We refer to $b_i$ as the buffer budget of level i and require that a packet of level i be accepted into buffer 701 only if there is enough budget available for it at levels i or below. Let $n_i$, i=1, 2, . . . , D denote the combined size of packets of level i that are stored in the Receiving Queue of link l. The above requirement may be stated as $$n_1 \leq b_1, \quad (5)$$

$$n_1 + n_2 \leq b_1 + b_2, \quad (6)$$

or, more generally $$\sum_{j=1}^{j=i} n_j \leq \sum_{j=1}^{j=i} b_j, \quad i = 1, 2, \ldots D. \quad (7)$$

Equivalently, we may define buffer threshold constraints $$B_i = \sum_{j=1}^{j=i} b_j$$

that limit the maximum buffer capacity that can be occupied by packets of level less than or equal to i. At all times, all $B_i$ buffer threshold constraints must be satisfied (as in Equation (7)). Note that $B_D = b^l$, the size of the buffer.

Figure 8:
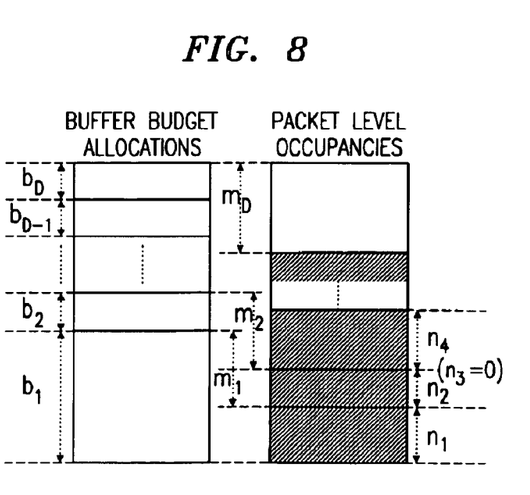
FIG. 8 is a diagram illustrating the buffer management parameters assigned, in accordance with the present invention, to the buffer of FIG. 7.

In order to observe the above requirements (to prevent deadlocks and livelocks), it is not necessary to physically partition the Receiving Queue into different segments. Instead, as illustrated in FIG. 8, which is another view of buffer 701 of FIG. 7, the above requirement may be implemented using a set of-buffer management parameters $m_i$ defined as $$m_i \triangleq \sum_{j=1}^{j=i} (b_j - n_j), \, i = 1, 2, \ldots, D. \quad (8)$$

Equivalently, $$m_i = B_i - \sum_{j=1}^{j=i} n_j.$$

$m_i$ refers to that part of the combined buffer budget of levels $j \leq i$, which is not allocated to packets of levels $j \leq i$. This means that out of the combined buffer budget of levels $j \leq i$, a budget $m_i$ is either allocated to packets of levels $j > i$ or not allocated to any packets at all. With this notation, $m_D$ equals the total size of the vacant space in the buffer. Notice that since packets of level j can use the buffer budget of any level $k \leq j$, the term $b_j - n_j$ in (8) can be negative, for some j. However, $m_i$ cannot be negative for any i since packets of levels $j \leq i$ cannot use the buffer budget of a level higher than i.

It follows from (8) that when a new packet of length $\gamma$ and level j is stored in the buffer (leaves the buffer), $m_i$ must be decreased (increased) by $\gamma$ for all $i \geq j$. Similarly, when the packet's level is increased from j to k, then according to (8), $m_i$ must be increased by $\gamma$ for all levels i, $k > i \geq j$.

The above results also provide the guideline for choosing the Transmit Feedback $f_l$ to be sent over the reverse link l' to the upstream node. Since the parameters $m_i$ should always be nonnegative, the buffer can store a new packet of level j and arbitrary length, provided that currently $m_i \geq \gamma_{max}$ for all $i \geq j$. On the other hand, when a packet arrives following the sending of the Transmit Feedback $f_l$, the level assigned to it could be as low as $1+f_l$. Since we would like to set the value of the Transmit Feedback $f_l$ as low as possible, we conclude that $f_l$ should be set to a level j such that $m_i \geq \gamma_{max}$ for all $i \geq j+1$, and $m_j < \gamma_{max}$. It follows that $f_l$ should be set to the highest level j for which $m_j < \gamma_{max}$. Accordingly, if $m_i \geq \gamma_{max}$ for all i=1, 2, . . . D, then we set $f_l = 0$, allowing the transmission of packets of any level, over link l. Conversely, if $m_D < \gamma_{max}$, then it follows that $f_l = D$. As we said before, if there is any packet of level D in the upstream node, it must be destined for that node itself. Therefore, all packets waiting to be sent over link l must have a level less than D. It follows that, with the Transmit Feedback set to D, no packet is eligible to be sent over l.

We now summarize the rules to be followed in accordance with the present invention for feedback setting of link l and management of its Receiving Queue.

Buffer Management Rules:

When the Receiving Queue of link l is empty, initiate $$m_i = \sum_{j=1}^{j=i} b_j, \ i = 1, 2, \ldots, D. \quad (9)$$

If a packet of length γ arrives and is buffered at level j, decrease $m_i$ by γ, for $i \geq j$.
If a packet of length γ and level j leaves the buffer, increase $m_i$ by γ, for $i_{24 \, j}$.
If a packet of length γ is increased from level j to level k>j, increase $m_i$ by γ, for all i, such that $k > i \geq j$.

Transmit Feedback Rule:
Set link l's Transmit Feedback $f_l=j$, where j is the largest level for which $m_j < \gamma_{max}$. If no such level exists, set $f_l=0$.

Finally, it is to be noted that, as the result of applying the selective backpressure technique in accordance with the present invention, by selectively designating packets as eligible for transmission, the present invention improves the normal operation of scheduler $S_l$ of each link l. This improvement is obtained because, through the use of our eligibility control mechanism, the order in which packets waiting for transmission are in fact transmitted, is changed from the order that would otherwise occur through the operation of scheduler $S_l$. This is in contrast to the performance of a plain backpressure mechanism, which does not change the order of packet transmissions over a link, since either all packets waiting at a link are eligible for transmission or no packet may be sent at all.

Figure 9:
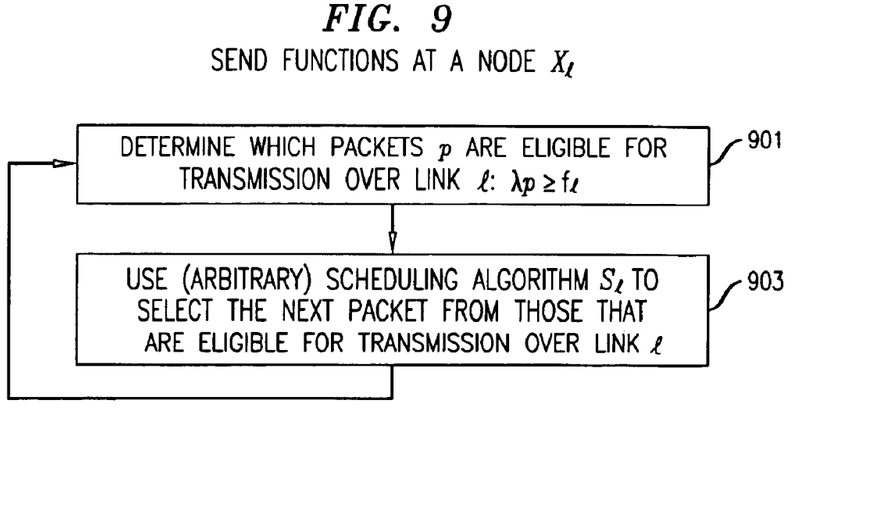
FIG. 9 is a flow chart illustrating the send functions performed at a sending node $X_j$.

FIG. 9 is a flow chart illustrating the send functions performed at a sending node $X_l$. In step 901, a determination is made as to which packets are eligible for transmission over link l, by determining if the priority level for a packet is greater or equal to the feedback level, or $\lambda_p \geq f_l$, as in Equation 1. Any arbitrary scheduling algorithm $S_l$ is then used to select the next packet for transmission from among those that are eligible, in step 903, whereupon the process of FIG. 9 returns and repeats step 901.

Figure 10:
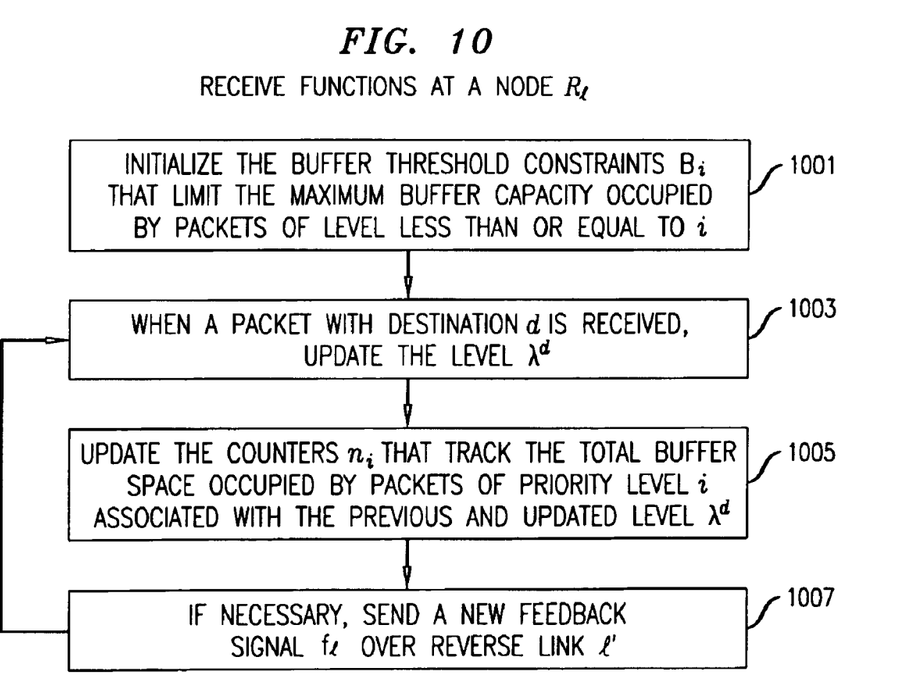
FIG. 10 is a flow chart illustrating the receive functions performed at a receiving node $R_j$.

FIG. 10 is a flow chart illustrating the receive functions performed at a receiving node $R_l$. In step, 1001, the buffer threshold constraints $B_i$ are initialized. Then, in step 1003, the priority level $\lambda^d$ of packets destined for destination d is updated. Next, in step 1005, the counters $n_i$ that track the total buffer space occupied by packets with the priority levels i, are up dated. Note here that at most two counters $n_i$ can possibly change: if the incoming packet results in the priority level $\lambda^d$ being raised to $1+f_l$, then the counters $n_i$ associated with both the previous (prior to arrival of the incoming packet) and new priority levels are changed; alternatively, if $1+f_l$ is less than or equal to the previous priority level $\lambda^d$, then only the counter $n_i$ associated with that priority level is changed.

In step 1007, a new feedback signal $f_l$ is sent over reverse link l', if necessary, i.e., if the status of any buffers have changed such that the feedback signal has changed in accordance with the requirement that the feedback $f_l$ sent from the receiving node $R_l$ to the sending node $X_l$ represents the lowest priority level of packets that the receiving node $R_l$ could accept without violating any of the $B_i$ buffer threshold constraints. In other words, the feedback value must be set such that the receiving node $R_l$ will have room to accept packets of priority level $(1+f_l)$ or greater, without violating any of the buffer threshold constraints. The process then returns to step 1003, where the process is repeated when subsequent packets are received.

As indicated previously, one major advantage of the present invention is that the sending of the Transmit Feedback signals to the upstream neighbor is easily implemented in currently available IEEE 802.3 gigabit Ethernet, using the standard PAUSE frames. The invention can also be used in other networks that use different methods to signal congestion status to upstream nodes. Rather than coding the PAUSE frame's parameter to represent the period of time that the upstream neighbor should not send data frames, the parameter is coded to represent the various Transmit Feedback values.

Various alternatives and extensions of the present invention are possible. For example, up to this point, we have ignored the effects of propagation delays. The basic modification needed to incorporate propagation delays into the present invention is to make sure that nodes transmit their feedback signals with enough "lead time" so that the controls "take effect" at the appropriate moments (assuming worst-case conditions). For example, if a node determines that for a given incoming link a particular Transmit Feedback signal needs to take effect at time to, then it will need to transmit the signal at time $t_0-T$, where T is the round-trip propagation time of that link. As the buffer occupancy continues to change, note that a node might need to transmit an updated Transmit Feedback between the time $t_0-T$ and the time $t_0$.

Specifically, very little needs to change to incorporate the effects of a round-trip delay T in the present invention. The Transmit Eligibility Rule and the Buffer Management Rules are unchanged. Only the Transmit Feedback Rule and the Level Assignment Rules need to be slightly modified. First, in determining what Transmit Feedback to send at time $t_0$, the receiving node $R_l$ needs to consider the "worst-case" (maximum) occupancy of its Receiving Queues at time $t_0+T$ in the future. If the link rate from $X_l$ to $R_l$ is r, then the occupancy of a Receiving Queue may increase by at most rT. Consequently, the modified rule is:

Transmit Feedback Rule:
Set link l's Transmit Feedback $f_l=j$, where j is the largest level for which $m_j - rT < \gamma_{max}$. If no such level exists, set $f_l=0$.

If desired, more complex "book-keeping" algorithms can also be incorporated to make more efficient use of memory and bandwidth resources. Using techniques similar to those proposed in "A New Feedback Congestion Control Policy for Long Propagation Delays", by I. Iliadis, *IEEE J. Select. Areas Commun.*, Vol. 13, pp. 1284–1295, September 1995, and information about the recent history (from time $t_0-T$ to time $t_0$) of feedback signals that were transmitted on a link to an upstream neighbor can be used to compute an upper bound (perhaps, less than rT) on the amount of information that will reach the downstream node between time $t_0$ and time $t_0+T$.

Second, the (modified) Level Assignment Rule is based on the current buffer occupancy (just as in the T=0 special case considered previously):

Level Assignment Rule:
When a packet p with destination d arrives from another network node over some link l, the level associated with d is updated as $$\gamma^d \leftarrow \max(\gamma^d, 1+j), \quad (10)$$

where j is largest level for which currently $m_j < \gamma_{max}$ (if no such level exists, set j=0). Note that because we make worst-case assumptions in the (modified) Transmit Feedback Rule, we can assign levels to packets at time $t_0$ without needing to remember what Transmit Feedback value was sent at time $t_0-T$. Note that the Transmit Feedback value j* at time $t_0$ is greater than or equal to the j value in the Level Assignment Rule at time $t_0+T$. This greatly simplifies the implementation.

What happens if the receiving node $R_l$ has an incorrect estimate of the round-trip propagation delay T? If the actual delay is greater than the estimate, then some packet loss may occur and deadlocks are possible. On the other hand, if the actual propagation delay is less than the estimated value used by node $R_l$, then the only penalty is a (slight) loss in efficiency and perhaps some wasted buffer. Consequently, in local and metropolitan area network applications where link propagation delays are small it might be preferable to select some upper bound on link propagation delays of the network as the parameter T used on all links—just as there are maximum distances for links due to physical constraints. If the protocol is used in wide area networks, however, it is probably better to individually set the T parameter for each link. Finally to guarantee no packet loss in the presence of nonzero propagation delays, the buffer size must be increased such that $b_1 \geq \gamma_{max}+rT$. Equation (3), constraining by, still holds for $i=2, 3, \ldots, D$. Another option in dealing with long-propagation environments is to reinterpret some of the Transmit Feedback values (most likely the higher values) as permission to transmit up to a specified maximum number of packets of specified levels, rather than an unlimited number of packets. Additional Transmit Feedback messages would need to be sent to grant permission to transmit additional packets.

Before briefly presenting a few other possible extensions of the present invention, it is important at this point to mention the relationship of the invention with end-to-end congestion control techniques. While the present invention addresses the problems of short-term congestion overflows and deadlocks, it does not address the issue of fairness in providing service to different users. One way of resolving this shortcoming is to couple this technique with end-to-end congestion control schemes that handle congestion problems on a quasi-static basis while providing the desired fairness and/or priorities in the amount of services given to different users in the long run. This can be accomplished in a number of ways that will be apparent to persons skilled in the art. (See, for example, "A Class of End-to-End Congestion Control Algorithms for the Internet" by S. J. Golestani et al., *Proc. 6$^{th}$ International Conf. On Network Protocols*, October 1998.)

Finally, we mention a few more possible extensions of the present invention. First, it is sometimes advantageous to incorporate some packet dropping to address other network issues, such as aging of packets due to errors, and blocking caused when certain network links are "overloaded". (See "A Simple Technique that Prevents Packet Loss and Deadlocks in Gigabit Ethernet", by M. Karol et al, *Proc. 1999 International Symposium on Communications (ISCOM'99)*, pp. 26–30, November 1999.) Second, if it is desired to internetwork the proposed lossless network with a network (e.g., TCP) that depends on losses to rate control its sources, then it is simple to design a "gateway" between the two networks. For instance, an edge device near a TCP source, or near the WAN, could be used to convert the lossless LAN's end-to-end technique to the TCP "loss technique" (i.e., by dropping packets) to implicitly rate control the TCP sources. Third, the present invention can be modified such that some Classes of Service (CoS) will be allowed to "ignore" the Transmit Feedback congestion control signals that gradually restrict the set of packets eligible for transmission. This is possible if, perhaps, there are dedicated buffers set aside for them. Alternatively, all nodes might be programmed to always treat particular CoS packets to be of no less than a certain minimum level.

The invention claimed is:

1. In a network of nodes connected to each other via bidirectional links, each of said nodes having a buffer for storing packets prior to transmission toward an ultimate destination, a method to control congestion on each of said links, said method comprising the steps of:

assigning a priority level $\lambda_p$ from amongst at least two possible priority levels, to packets stored in a sending node $X_l$ buffer for transmission downstream via a link l to a receiving node $R_l$, said link l being a portion of the path from said sending node $X_l$ to said ultimate destination;

transmitting upsteam, via said link l, a feedback value $f_l$ from said receiving node $R_l$ to said sending node $X_l$, said feedback value $f_l$ being indicative of the ability of said receiving node $R_l$ to store said packet in said receiving node $R_l$ buffer; and transmitting downstream from said sending node $X_l$ to said receiving node $R_l$, via said link l, only those packets stored in said sending node $X_l$ buffer whose priority level $\lambda_p$ equals or exceeds the feedback value $f_l$.

2. In a network of nodes connected to each other via bidirectional links, each of said nodes having a buffer for storing packets prior to transmission toward an ultimate destination, a method to control congestion on each of said links, said method comprising the steps of:

assigning a priority level $\lambda_p$ from amongst at least two possible priority levels, to packet stored in a sending node $X_l$ buffer for transmission downstream via a link l to a receiving node $R_l$, said link l being a portion of the path from said sending node $X_l$ to said ultimate destination, wherein said priority level $\lambda_p$ is periodically changed when a packet is received in said receiving node $R_l$, such that when a packet p with ultimate destination d arrives at $R_l$ from another network node ($X_j$) over some link l, the priority level $\lambda^d$ of all packets at $R_l$ destined for node d, is updated as the maximum of (a) the prior value of $\lambda_d$ at $R_l$, or (b) $1+f_l$;

transmitting upstream, via said link l, a feedback value $f_l$ from said receiving node $R_l$ to said sending node $X_l$, said feedback value $f_l$ being indicative of the ability of said receiving node $R_l$ to store said packet in said receiving node $R_l$ buffer, and transmitting downstream from said sending node $X_l$ to said receiving node $R_l$, via said link l, only those packets stored in said sending node $X_l$ buffer whose priority level $\lambda_p$ equals or exceeds the feedback value $f_l$.

3. In a network of nodes connected to each other via bidirectional links, each of said nodes having a buffer for storing packets prior to transmission toward an ultimate destination, a method to control congestion on each of said links, said method comprising the steps of:

assigning a priority level $\lambda_n$ from amongst at least two possible priority levels to packets stored in a sending node $X_l$ buffer for transmission downstream via a link l to a receiving node $R_l$, said link l being a portion of the path from said sending node $X_l$ t to said ultimate destination, wherein the maximum value of said priority level $\lambda_p$ is equal to the difference between (a) the maximum number D of nodes that a packet may traverse through said network from any originating node to any ultimate destination, and (b) the number of nodes between said sending node $X_l$ and said ultimate destination node;

transmitting upstream, via said link l, a feedback value $f_l$ from said receiving node $R_l$ to said sending node $X_l$, said feedback value $f_l$ being indicative of the ability of said receiving node $R_l$ to store said packet in said receiving node $R_l$ buffer; and transmitting downstream from said sending node $X_l$ to said receiving node $R_l$, via said link l, only those packets stored in said sending node $X_l$ buffer whose priority level $\lambda_p$ equals or exceeds the feedback value $f_l$.

4. The method defined in claim 1 wherein said packets stored in said sending node $X_l$ buffer whose priority level $\lambda_p$ equal or exceeds the feedback value $f_l$ are designated as eligible packets, and wherein said transmitting step includes processing said eligible packets in accordance with a prioritization algorithm.

5. The invention defined in claim 4 wherein said prioritization algorithm operates on a first-in/first out basis.

6. The invention defined in claim 4 wherein said prioritization algorithm operates on a round robin basis.

7. The invention defined in claim 1 wherein said feedback value $f_l$ is determined by setting in the buffer at the receiving node $R_l$ thresholds $B_i$ that limit the maximum amount of space for packets with priority levels $\lambda^d$ less than or equal to l, monitoring the priority levels $\lambda^d$ of arriving and departing packets and the total space in the buffer at $R_l$ occupied by packets of various priority levels $\lambda^d$, increasing priority levels $\lambda_p$ of previously-stored packets, and transmitting from the receiving node $R_l$ to the sending node $X_l$ a feedback value $f_l$ that represents the lowest priority level of packets that the node $R_l$ could accept without violating any of the $B_i$ buffer threshold constraints.

8. In a network of nodes connected to each other via bidirectional links, each of said nodes having a buffer for storing packets prior to transmission toward an ultimate destination, a method to control congestion on each of said links, said method comprising the steps of:

assigning a priority level $\lambda_p$ from amongst at least two possible priority levels, to packets stored in a sending node $X_l$ buffer for transmission downstream via a link l to a receiving node $R_l$, said link l being a portion of the path from said sending node $X_l$ to said ultimate destination;

transmitting upstream, via said link l, a feedback value $f_l$ from said receiving node $R_l$ to said sending node $X_l$, said feedback $f_l$ being indicative of the ability of to said receiving node $R_l$ to store said packet in said receiving node $R_l$ buffer wherein said feedback value $f_l$ is determined by setting in the buffer at the receiving node $R_l$ thresholds $B_i$ that limit the maximum amount of space for packets with priority levels $\lambda^d$ less than or equal to i, monitoring the priority levels $\lambda^d$ of arriving and departing packets and the total space in the buffer at $R_l$ occupied by packets of various priority levels $\lambda^d$, increasing priority levels $\lambda_p$ of previously-stored packets, and transmitting from the receiving node $R_l$ to the sending node $X_l$ a feedback value $f_l$ that represents the lowest priority level of packets that the receiving node $R_l$ could accept without violating any of the $B_i$ buffer threshold constraints, wherein said increasing step includes periodically changing said priority level $\lambda_p$ when a packet is received in said receiving node $R_l$, such that when a packet p with ultimate destination d arrives at $R_l$ from another network node $(X_j)$ over some link l, the priority level $\lambda^d$ at $R_l$ associated with d is updated as the maximum of the prior value of $\lambda^d$ at $R_l$, or $1+f_l$; and transmitting downstream from said sending node $X_l$ to said receiving node $R_l$, via said link l, only those packets stored in said sending node $X_l$ buffer whose priority level $\lambda_p$ equals or exceeds the feedback value $f_l$.

9. In a packet communication network comprised of interconnected nodes arranged to transmit variable length packets to adjacent nodes, wherein each node includes a buffer for storing packets enroute from a source node to a destination node, a method of controlling the transmission of a packet p from a sending node $X_l$ to a receiving node $R_l$, via a link l, said method comprising the steps of sending from the receiving node $R_l$ to the sending node $X_l$ a feedback level $f_l$ such that there will be room in the buffer in the receiving node $R_l$ to store packets subsequently received from the upstream node $X_j$;

assigning a priority level $\lambda_p$ to packets stored in the buffer of the receiving node $R_l$ such that all packets destined for the same destination have the same priority level; and transmitting from the sending node $X_l$ to the receiving node $R_l$, only those stored packets whose priority level $\lambda_p$ is at least equal to the feedback level received from the receiving node $R_l$.

10. In a packet communication network comprised of interconnected nodes arranged to transmit variable length packets to adjacent nodes, wherein each node includes a buffer for storing packets enroute from a source node to a destination node, a method of controlling the transmission of a packet p from a sending node $X_l$ to a receiving node $R_l$, via a link l, said method comprising the steps of sending from the receiving node $R_l$ to the sending node $X_l$ a feedback level $f_l$ such that there will be room in the buffer in the receiving node $R_l$ to store packets subsequently received from the upstream node $X_j$;

assigning a priority level $\lambda_p$ to packets stored in the buffer of the receiving node $R_l$ such that all packets destined for the same destination have the same priority level, wherein D is the maximum number of hops that a packet must traverse through said network from a source one of said nodes to a destination one of said nodes, and wherein said assigning step includes assigning a level that is less than or equal a to D minus the number of hops remaining between said receiving node $R_l$ and said destination; and transmitting from the sending node $X_l$ to the receiving node $R_l$, only those stored packets whose priority level $\lambda_p$ is at least equal to the feedback level received from the receiving node $R_l$.

11. In a packet communication network comprised of interconnected nodes arranged to transmit variable length packets to adjacent nodes, wherein each node includes a buffer for storing packets enroute from a source node to a destination node, a method of controlling the transmission of a packet p from a sending node $X_l$ to a receiving node $R_l$, via a link l, such that (a) feedback is provided from each receiving node to each sending node regarding the fullness of the buffer at said receiving node, and (b) the occurrence of deadlocks and livelocks in said receiving node is avoided and no packets sent from said sending node $X_l$ to said receiving node $R_l$ are lost, said method comprising the steps of transmitting from said receiving node $R_l$ to said sending node $X_l$, a periodically updated transmit feedback parameter $f_l$, said feedback value $f_l$ being determined by (i) setting in the buffer at the receiving node $R_l$ thresholds $B_i$ that limit the maximum amount of space for packets with priority levels $\lambda^d$ less than or equal to i, (ii) monitoring at the receiving node $R_l$ the priority levels $\lambda^d$ of arriving and departing packets and the total space in the buffer at $R_l$ occupied by packets of various priority levels $\lambda^d$, (iii) increasing priority levels $\lambda_p$ of previously-stored packets, and (iv) adjusting the feedback $f_l$ sent from the receiving node $R_l$ to the sending node $X_l$ to represent the lowest priority level of packets that the receiving node $R_l$ could accept without violating any of the $B_i$ buffer threshold constraints, assigning in said sending node $X_l$, a level table associating, for each destination d to which said sending node may transmit a packet a level $\lambda^d$, such that (a) $\lambda^d$ is initially zero, (b) any packet in said node intended for destination d has the same level, and (c) when a packet arrives at sending node $X_l$ intended for destination d, $\lambda^d$ is updated as the maximum of the previous value of $\lambda^d$ or $(1+f_l)$, whichever is greater, and permitting sending node $X_l$ to end a packet to receiving node $R_l$ only if $_{80}{}^d \geq f_l$.

12. In a network of nodes connected to each other via bidirectional links, each of said nodes having a buffer for storing packets prior to transmission toward an ultimate destination, a method to provide feedback from receiving nodes to sending nodes to control packet transmission such that packets are not lost, and transmission of packets can occur without creating overflow in said buffers and without creating deadlocks or livelocks, said method comprising the steps of:

assigning a priority level $\lambda_p$ from amongst at least two possible priority levels, to packets stored in a sending node $X_l$ buffer for transmission downstream via a link l to a receiving node $R_l$, said link l being a portion of the path from said sending node $X_l$ to said ultimate destination;

transmitting upstream, via said link l, a feedback value $f_l$ from said receiving node $R_l$ to said sending node $X_l$, said feedback value $f_l$ being indicative of the ability of said receiving node $R_l$ to store said packet in said receiving node $R_l$ buffer;

transmitting downstream from said sending node $X_l$ to said receiving node $R_l$, via said link l, only those packets stored in said sending node $X_l$ buffer whose priority level $\lambda_p$ is at least equal to the feedback value $f_l$; and periodically adjusting said feedback value $f_l$ and said priority level $\lambda_p$.

13. The invention defined in claim 9 wherein said assigning steps includes assigning a priority level $\lambda_p$ such that packets closer to their destination have a higher priority level.

\* \* \* \* \*